US008889007B2

(12) United States Patent
Lowe et al.

(10) Patent No.: US 8,889,007 B2
(45) Date of Patent: Nov. 18, 2014

(54) COILED CONTINUOUS FLOW WATER TREATMENT APPARATUS AND METHOD

(76) Inventors: David Mark Lowe, Lake Stevens, WA (US); Richard D. Eldredge, Lake Stevens, WA (US)

( * ) Notice: Subject to any disclaimer, the term of this patent is extended or adjusted under 35 U.S.C. 154(b) by 735 days.

(21) Appl. No.: 13/181,515

(22) Filed: Jul. 13, 2011

(65) Prior Publication Data

US 2011/0278220 A1 Nov. 17, 2011

Related U.S. Application Data

(63) Continuation-in-part of application No. 12/378,716, filed on Feb. 19, 2009, now abandoned.

(51) Int. Cl.
| | | |
|---|---|---|
| B01D 37/04 | (2006.01) | |
| C02F 3/00 | (2006.01) | |
| C02F 3/04 | (2006.01) | |
| C02F 3/12 | (2006.01) | |
| C02F 3/28 | (2006.01) | |
| B01D 24/48 | (2006.01) | |
| B01D 24/14 | (2006.01) | |
| B01D 24/46 | (2006.01) | |

(52) U.S. Cl.
CPC ............ C02F 3/006 (2013.01); B01D 24/4869 (2013.01); B01D 24/14 (2013.01); B01D 24/4631 (2013.01); C02F 3/043 (2013.01); C02F 3/1242 (2013.01); C02F 3/288 (2013.01); C02F 2209/42 (2013.01); C02F 2209/44 (2013.01); C02F 2301/026 (2013.01); C02F 2301/043 (2013.01); C02F 2303/16 (2013.01); C02F 2307/08 (2013.01); Y10S 210/921 (2013.01)

USPC ........ 210/617; 210/747.1; 210/744; 210/805; 210/85; 210/86; 210/104; 210/921; 210/257.1; 210/291; 210/532.2; 210/108; 210/123; 210/195.1

(58) Field of Classification Search
None
See application file for complete search history.

(56) References Cited

U.S. PATENT DOCUMENTS

| | | | | |
|---|---|---|---|---|
| 5,766,475 | A * | 6/1998 | Mayer et al. | 210/605 |
| 6,132,599 | A * | 10/2000 | Chaffee | 210/86 |
| 6,309,539 | B1 * | 10/2001 | Mayer | 210/86 |
| 6,372,128 | B1 * | 4/2002 | Belhumeur | 210/137 |
| 6,506,298 | B2 * | 1/2003 | Albert | 210/137 |

* cited by examiner

Primary Examiner — Terry Cecil
(74) Attorney, Agent, or Firm — Joseph Z. Ellsworth

(57) ABSTRACT

The present invention is a wastewater treatment system utilizing a recirculating filter system comprising sand, gravel, or synthetic media. Septic effluent is continuously, or approximately continuously, dosed under pressure to the treatment media through pressure compensating drip irrigation emitters. The system comprises a commonly known septic tank and recirculation tank. Septic tank effluent is collected in the recirculation tank, from which it is continually dosed by means of a pump to the top of the treatment media of the recirculating filter through pressure compensating drip emitters. Continuous dosing of diluted residential septic tank effluent through drip irrigation emitters provides a slow consistent application of liquid rich in organic material and pathogens over the treatment media. The treated effluent is then recirculated if water is low or went to final disposal.

12 Claims, 4 Drawing Sheets

COILED CONTINUOUS FLOW WATER TREATMENT APPARATUS AND METHOD

This patent is a Continuation in Part of application Ser. No. 12/378,716 filed Feb. 19, 2009, now abandoned.

FIELD OF THE INVENTION

The present invention relates to the treatment of waste water from residential or commercial properties and more specifically an improvement in the amount of water that can be treated per unit of time.

BACKGROUND OF THE INVENTION

As the population of the country increases so does the demand for land and housing. Many of these demands for land and housing result in people moving to areas that do not have public sewer systems or have lot sizes too small for septic. Conventional onsite wastewater systems require a large land area, putting a premium cost on real estate in many locations or the soil in the area will not support a conventional system. The increasing price on real estate and the high density of residential and commercial building, make it desirable to reduce the area required for wastewater treatment and still treat the wastewater to acceptable standards. The amount of effluent a system can treat is directly related to the surface area of filter media available to the system and the amount of wastewater that is passed through the available filter media. Most sand, gravel, or synthetic media wastewater treatment systems are dosed intermittently, either a single pass or recirculated, and rely upon a repeat cycle timer and a pump to regulate the frequency and volume of the wastewater applied to the surface of the treatment media. The timers are set with specific on and off time intervals. The off times determine the number of doses over time and the on times determine the dose volume. In all cases, there are distinct dosing and resting periods to prevent overloading the media past the point of failure. Even in cases where drip irrigation tubing is used in treatment systems, very distinct dosing schedules are used. In recirculating sand and gravel filters as well as synthetic packed-bed-filters, repeat cycle timers are the traditional methodology for flow control. Therefore, there is a need for a wastewater treatment system that is compact in area, simple to use, and treats water continuously while maintaining the standards required by law.

PRIOR ART

In the prior art patent Chaffee et al. (U.S. Pat. No. 6,132,599) a waste water treatment unit that has a treatment media filter over the recirculation tank and dosing tank. This unit is compact but doesn't have a means for cleaning its filters or emitters.

Albert (U.S. Pat. No. 6,506,298) is a waste water treatment filter that uses peat moss as the filtration media and has a mechanism that never allows more effluent into the filter than the filter can treat and has elongated discharge orifice that emit effluent on the filter media.

Belhumeur (U.S. Pat. No. 6,372,128) is a waste water treatment filter that uses peat moss as the filtration media and has a mechanism the never allows more effluent into the filter than the filter can treat.

Mayer (U.S. Pat. No. 6,309,539) is a waste water treatment system with a splitter system but does not have an inline filter that allows for a larger volume of wastewater treatment.

SUMMARY OF THE INVENTION

The need for more waste water treated in smaller and smaller areas is apparent in all growing cities. The present invention is a wastewater treatment system utilizing a recirculating filter system comprising sand, gravel, or synthetic media. Septic effluent is continuously, or approximately continuously, dosed under pressure to the treatment media through pressure compensating drip irrigation emitters. The system comprises a commonly known septic tank and recirculation tank. Septic tank effluent is collected in the recirculation tank, from which it is continually dosed by means of a pump to the top of the treatment media of the recirculating filter through pressure compensating drip emitters. Continuous dosing of diluted residential septic tank effluent through drip irrigation emitters provides a slow consistent application of liquid rich in organic material and pathogens over the treatment media. The slow discharge of effluent into the media creates a thin film of wastewater over the individual media particles as the liquid migrates to the bottom of the treatment unit. This allows for regular and continual contact of molecular oxygen, water, organic material, and bacteria. Treated wastewater or filtrate collected from the bottom of the recirculating filter returns to the recirculating tank, either by gravity flow or under pressure, through the flow splitter. During periods of low or no wastewater flow from the septic tank into the recirculation tank, the flow splitter will allow all or most of the filtrate from the treatment filter back into the recirculation tank. (By recirculating filtrate back into the recirculation tank, incoming septic tank effluent is diluted prior to being dosed to the filter). During periods of moderate or high wastewater flow, the flow splitter will allow all or a portion of the incoming filtrate to bypass the recirculation tank for final disposal.

DETAILED DESCRIPTION OF THE PREFERRED EMBODIMENT

Figure 1:
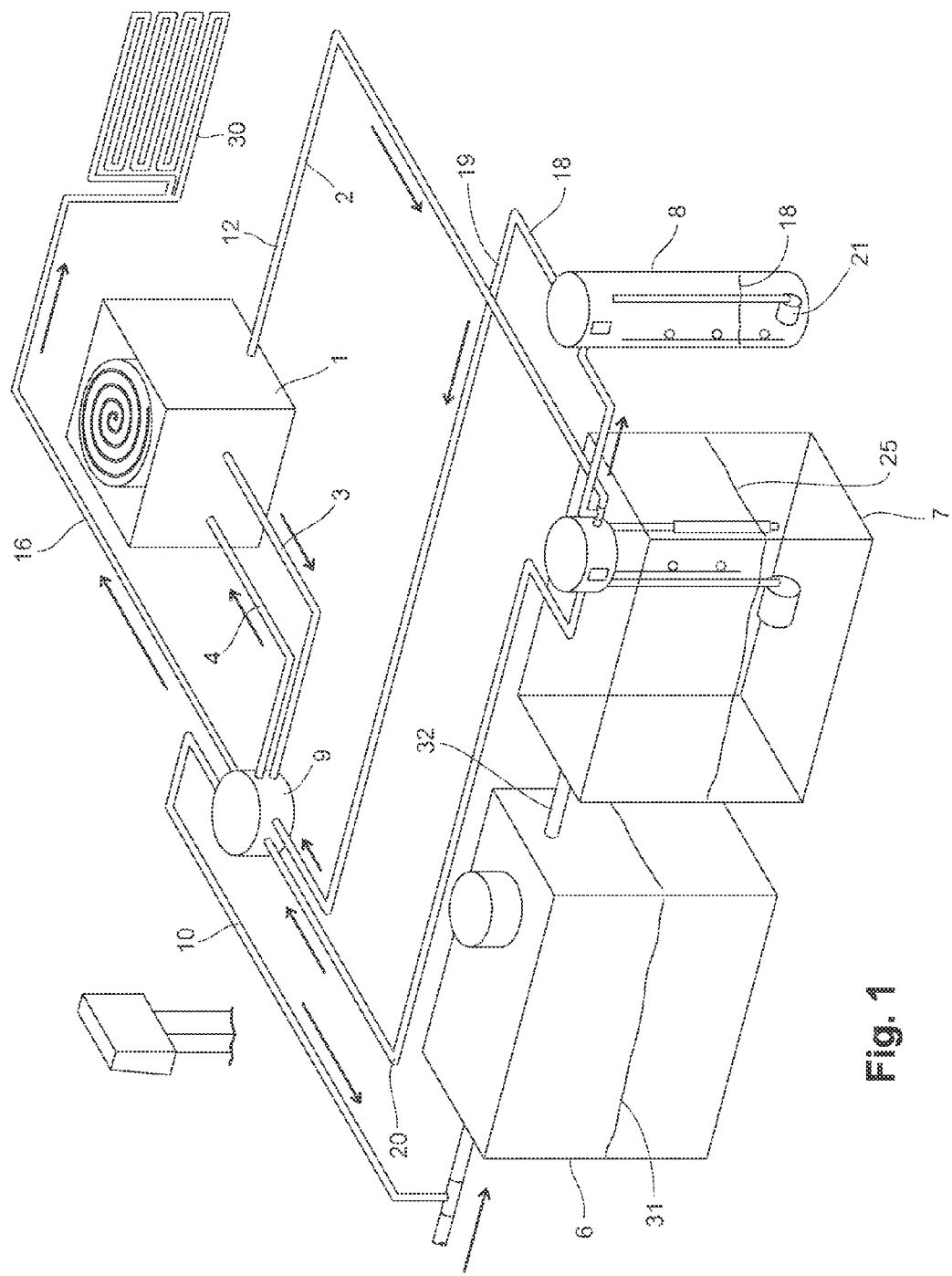
FIG. 1: Isometric view of the entire waste water treatment system with arrows showing flow of effluent in each pipe.
Figure 2:
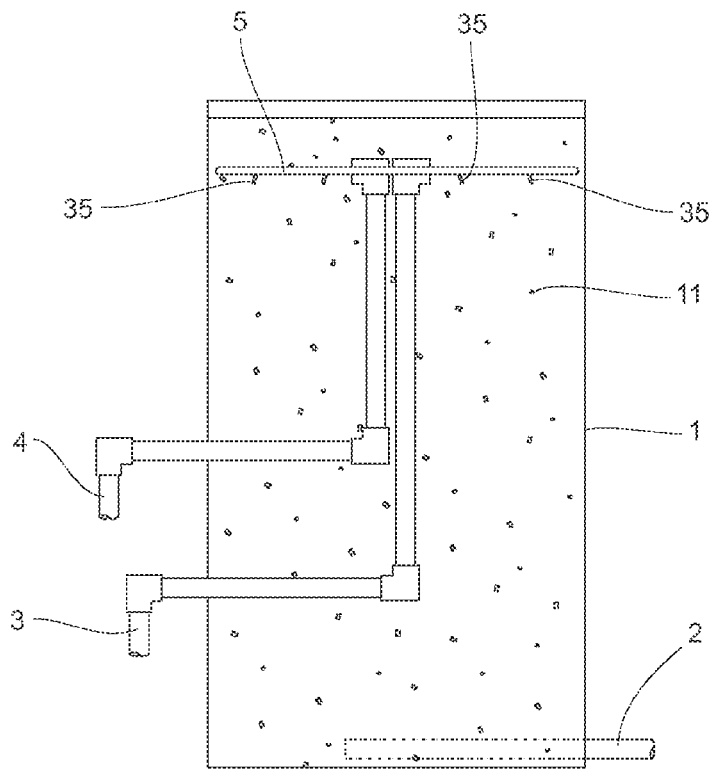
FIG. 2: Section view through the centerline of the media filter.
Figure 3:
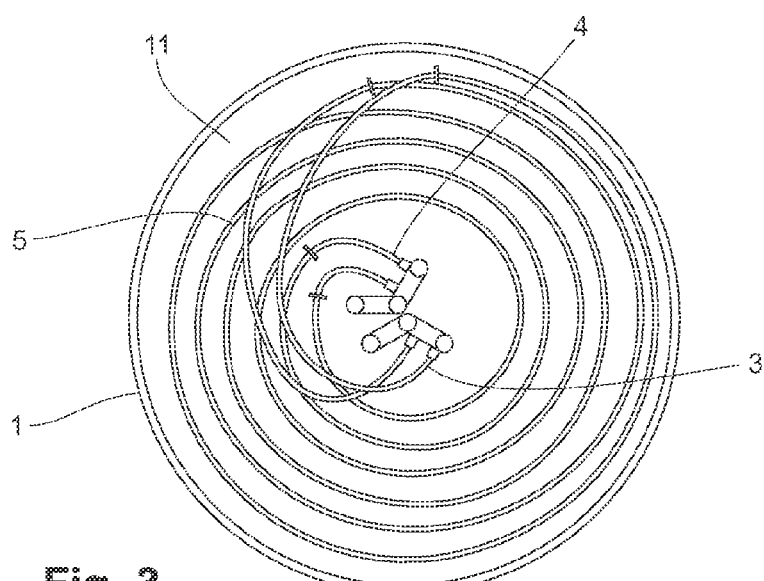
FIG. 3: Top view of the media filter showing the coils.
Figure 4:
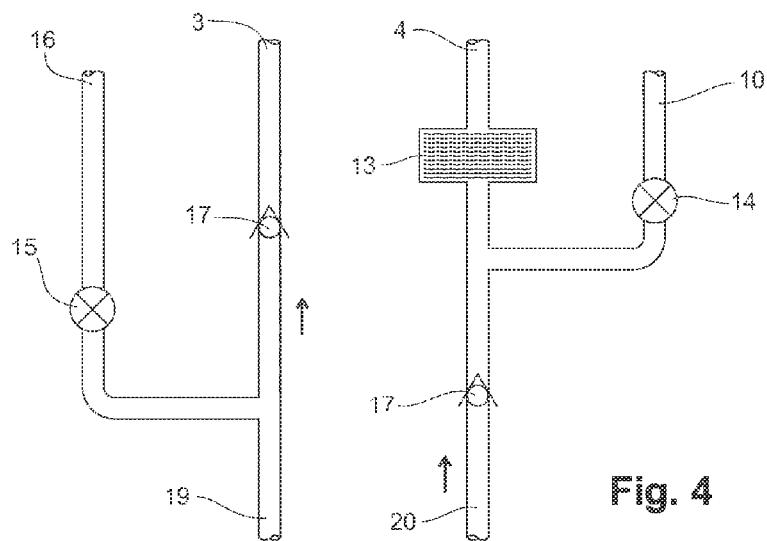
FIG. 4: Top view of the headworks. Showing the valves and filters.
Figure 5:
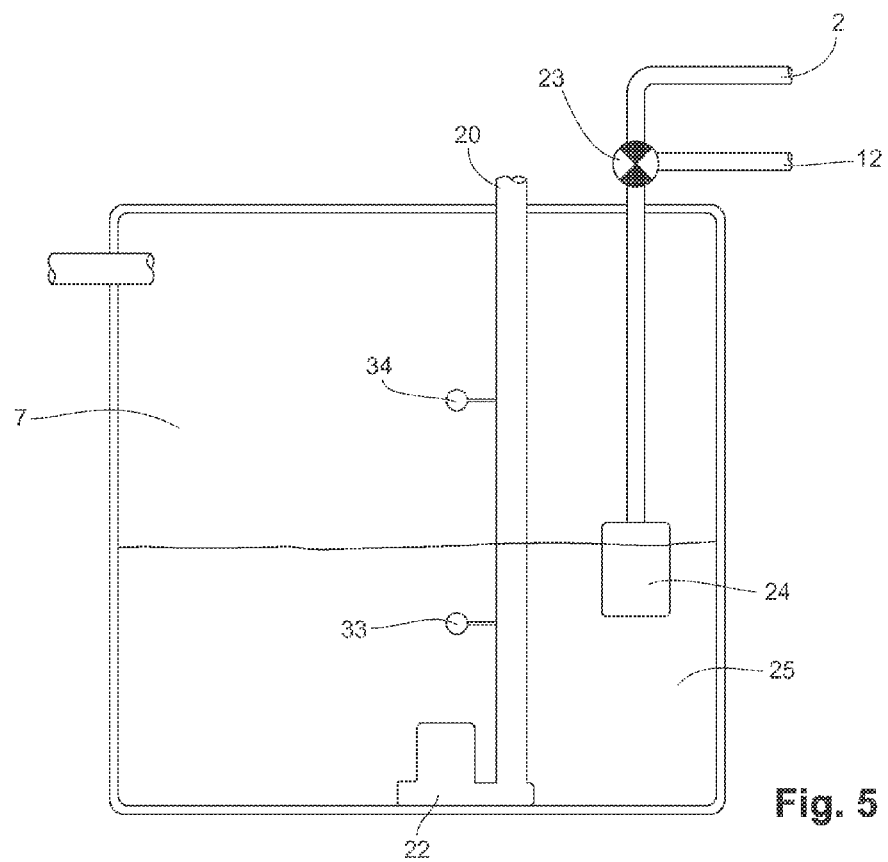
FIG. 5: Section cut of the recirculation tank.
Figure 6:
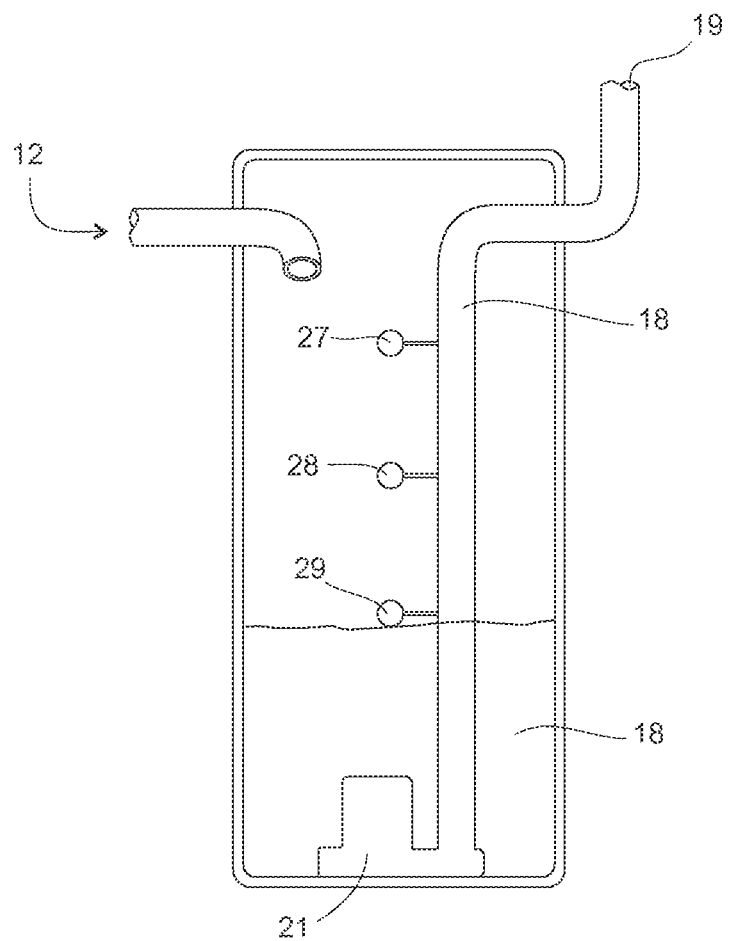
FIG. 6: Section cut of the surge tank.

The preferred embodiment of the present invention is a waste water treatment apparatus for treating waste water from residential or commercial buildings and the method for using the apparatus. The apparatus comprises a commonly known and used septic tank 6 which receives raw sewage 31 from a residence or commercial building. The solid waste only makes a fraction of the raw sewage 31 and remains in the septic tank 6. When the septic tank 6 is full the solids settle to the bottom and the primary untreated effluent 32 flows into the recirculation tank 7. The recirculation tank 7 has a recirculation pump 22 that will preferably be continually pumping diluted effluent 25 which is a mixture of the filtrate 12 and primary untreated effluent 32. Continual pumping maximizes the amount primary untreated effluent 32 that can be treated. The recirculation tank 7 has a recirculation pump redundant off float 33 which turns off the recirculation pump 22 when the diluted effluent 25 is below the desired level due to no system use or evaporation. If the recirculation pump fails, the water level will continue to rise until the recirculation tank alarm float 34 is actuated and a technician will be alerted and fix the system.

The diluted effluent 25 is pumped through a dosing line 20 to a head works 9. In the head works 9 the dosing line 20 has a check valve that doesn't allow liquid to travel back to the recirculation pump 22. The dosing line 20 during normal operation goes to an inline filter 13 preferably a commonly known disk filter and then to a supply line 4. The supply line 4 enters the media filter 1 preferably at the bottom and travels under the treatment media 11 and then up through the center of media filter 1 and attaches to the emitter coil 5. The emitter coil 5 is within the treatment media 11 preferably near the top. Drip emitters 35 preferably, pressure compensating drip irrigation emitters, release diluted effluent 25 which mixes with oxygen in voids of the treatment media 11. The emitter coil 5 is coiled to minimize head loss and to allow closer spacing of drip emitters 35. The diluted effluent 25 flows across the particles in the media 11 and is in continual contact with molecular oxygen, water, organic material, and bacteria. The dilute effluent 25 becomes filtrate 12 after the treatment process and collects in the bottom of the media filter 1. The filtrate 12 then enters the return line 2 and flows back to a split flow tee 23 outside the recirculation tank 7. If the level of diluted effluent 25 is high in the recirculation tank 7 then the splitter valve 24 closes and filtrate backflows through the split flow tee 23 to allow all filtrate 12 to pass to preferably the discharge basin/surge tank 8 or to a drain field 30. If the level of diluted effluent 25 is low in the recirculation tank 7 then, the splitter valve 24 opens to send the filtrate 12 back into the recirculating tank 7 to further dilute the dilute effluent 25.

When the level of treated water 18 is low in the discharge tank 8 the pump off float 29 keeps the discharge/flush pump 21 turned off. When treated water 18 is high, the water available float 28 allows the discharge pump/flush pump 21 to pump excess treated water 18 out through the discharge/flush line 19 but keeps enough water available for flushing the system. If the water level is too high the alarm float 27 is actuated and sounds an alarm and shuts off the recirculation pump 22.

Periodically, the inline filter 13, and the emitters 35 will get clogged and the emitter coil 5 will get build up. At regular intervals or when pressure behind the inline filter 13 is high due to build up, the lines will be flushed. The flushing sequence requires the normally open valve 15 to close and at the same time the normally closed valve 14 to open and the discharge/flush pump 21 to turn on. This discharge/flush pump is preferably higher pressure and causes the treated water 18 to travel through the discharge/flush line 19 to the head works 9. Instead of the treated water 18 moving out the discharge line 16 to the drain field 30, valve 15 is closed so it will travel through the check valve 17 and into flush line 3. The high pressure treated water 18 will then clean the emitter coil 5 and clean the emitters 35. The reverse direction and the preferably higher pressure of the treated water 18 will also clean the inline filter 13. The dirty flush water will not go to the recirculation pump 22 because the check valve 17 prevents it. Instead, it will travel through the open normally closed valve 14, through the inline filter flush line 10, and back into the septic tank 6.

Pressure gauges (not shown) can be provided before each valve and check valve.

Having described the invention what is claimed is:

1. A waste water treatment system comprising,
   a septic tank receiving raw sewage from a residence or commercial building,
   a recirculation tank having a recirculation pump for substantially continuously pumping effluent to a media filter,
   a recirculation pump redundant off float to prevent pump damage from lack of effluent,
   a recirculation tank alarm float to create noise and signal that the recirculation pump is malfunctioning,
   a dosing line that brings effluent from the recirculation tank to a head works, the head works having a check valve that doesn't allow liquid to travel back to the recirculation pump,
   an inline filter in a supply line delivering effluent from the head works to the media filter,
   wherein, the supply line enters the media filter to attach to a first end of an emitter coil,
   the emitter coil having a plurality of drip emitters within the treatment media,
   a return line connected between the media filter and a splitter valve inside the recirculation tank to deliver filtrate from the media filter to the recirculation tank,
   wherein, the splitter valve is actuated by fluid level,
   a discharge/flush tank in downstream fluid communication with the recirculation tank and the media filter and including a discharge/flush pump, wherein the discharge/flush pump includes (i) a pump off float that turns off the discharge/flush pump when treated water is low, (ii) a water available float that allows the discharge/flush pump to pump excess treated water, and (iii) an alarm float that sounds an alarm and shuts off the recirculation pump if treated water levels in the discharge/flush tank are too high,
   the discharge/flush pump in fluid communication with a flush line connected to a second end of the emitter coil and configured to reverse flush the emitter coil, the emitters and the inline filter,
   an inline filter flush line connected to the supply line and configured to carry flushed water back into the septic tank and,
   a discharge line in downstream flow communication with the discharge/flush pump and connected to a drain field for disposal of treated water.

2. The waste water treatment system of claim 1 wherein, the splitter valve sends filtrate to the discharge/flush tank, or back into the recirculating tank.

3. The waste water treatment system of claim 1 wherein, the splitter valve sends filtrate to the drain field, or back into the recirculating tank.

4. The waste water treatment system of claim 1 wherein, the emitters are pressure compensating emitters.

5. The waste water treatment system of claim 1 wherein, the inline filter is a disk filter which is easily flushed with reversed flow fluid.

6. The waste water treatment system of claim 1 further comprising, pressure gauges before each valve and check valve.

7. The waste water treatment system of claim 1 further comprising, a split flow tee outside the recirculation tank, wherein if the level of diluted effluent is high in the recirculation tank, then the splitter valve closes and filtrate backflows through the split flow tee to allow all filtrate to pass to the discharge/flush tank but, if the level of diluted effluent is low in the recirculation tank, then the splitter valve opens to send the filtrate back into the recirculating tank to further dilute the diluted effluent.

8. A method for treating waste water comprising the following steps:

providing a septic tank receiving raw sewage from a residence or commercial building, wherein, solid waste settles to the bottom of the septic tank and primary untreated effluent flows into a recirculation tank, wherein, the recirculation tank has a recirculation pump that substantially continually pumps diluted effluent which is a mixture of filtrate from a media filter and primary untreated effluent, providing in the recirculation tank a recirculation pump redundant off float to turn off the recirculation pump when the diluted effluent is below the desired level due to no system use or evaporation, actuating a recirculation tank alarm float when levels of fluid in the recirculation tank are too high, pumping diluted effluent from the recirculation tank through a dosing line to a head works, wherein the dosing line has a check valve that doesn't allow liquid to travel back to the recirculation pump, passing diluted effluent through an inline filter in a supply line in downstream fluid communication with the head works, passing diluted effluent through the supply line to a media filter, wherein the media filter includes an emitter coil and the supply line is connected to a first end of the emitter coil, the emitter coil having a plurality of drip emitters within the treatment media, passing the diluted effluent through the emitter coil, releasing diluted effluent through a plurality of drip emitters which mixes with oxygen in voids of a treatment media, wherein the dilute effluent becomes filtrate after passing through the treatment media and collects in the bottom of the media filter, passing filtrate through a return line connected between the media filter and a splitter valve inside the recirculation tank, passing the filtrate in the return line to the recirculation tank or a discharge/flush tank, wherein the discharge/flush tank is in downstream fluid communication with the recirculation tank and the media filter and includes a discharge/flush pump and discharge/flush line, actuating a water available float which turns on the discharge/flush pump as the treated water in the discharge/flush tank rises causing treated water to flow out of the discharge line to a drain field, actuating an alarm float positioned within the discharge/flush tank if the water level is too high, thereby sounding an alarm and shutting off the recirculation pump, providing a flushing sequence wherein, a normally open valve closes and at the same time a normally closed valve opens and the discharge/flush pump turns on, causing treated water to travel through the discharge/flush line, to the head works, wherein, the treated water travels into a flush line connected to a second end of the emitter coils to reverse flush clean the emitter coil and the drip emitters and to pass flushed water through the inline filter and back into the septic tank via an inline filter flush line connected the supply line.

9. The method of claim 8, wherein the discharge/flush pump provides more fluid pressure than the recirculation pump to ensure cleaning of the emitters, emitter coil and inline filter.

10. The method of claim 8, wherein the splitter valve closes and filtrate backflows through a split flow tee to allow all filtrate to pass to the drain field.

11. The method of claim 8, wherein a pump is used to get filtrate from the media filter back to the splitter valve.

12. The method of claim 8, wherein filtrate enters the return line and flows to a split flow tee outside the recirculation tank, wherein if the level of diluted effluent is high in the recirculation tank then, the splitter valve closes and filtrate backflows through the split flow tee to allow all filtrate to pass to the discharge/flush tank but, if the level of diluted effluent is low in the recirculation tank, then the splitter valve opens to send the filtrate back into the recirculating tank to further dilute the diluted effluent.

* * * * *